(12) United States Patent
Gronowicz, Jr.

(10) Patent No.: US 6,302,241 B1
(45) Date of Patent: Oct. 16, 2001

(54) BRAKE PAD WEAR SENSOR

(75) Inventor: William Gronowicz, Jr., Westland, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 09/796,477

(22) Filed: Mar. 2, 2001

(51) Int. Cl.[7] .................................................. B60T 17/22
(52) U.S. Cl. ...................... 188/1.11 L; 340/454; 73/129; 188/1.11 W
(58) Field of Search ...................... 188/1.11 L, 1.11 W; 116/208; 340/454; 73/129, 130

(56) References Cited

U.S. PATENT DOCUMENTS

| | | | | |
|---|---|---|---|---|
| 3,675,197 | * | 7/1972 | Bennett et al. | 188/1.11 L |
| 3,914,734 | * | 10/1975 | Rigalt | 188/1.11 L |
| 3,958,445 | * | 5/1976 | Howard et al. | 188/1.11 L |
| 4,020,454 | * | 4/1977 | Malonee | 340/454 |
| 4,437,547 | * | 3/1984 | Harmer | 116/208 |
| 4,606,435 | * | 8/1986 | Johnson | 188/1.11 L |
| 5,637,794 | * | 6/1997 | Hanisko | 73/129 |
| 5,999,093 | * | 12/1999 | Hanisko | 340/454 |
| 6,098,453 | * | 8/2000 | Chodkowski | 340/454 |
| 6,105,422 | * | 8/2000 | Pollock et al. | 73/129 |

* cited by examiner

Primary Examiner—Christopher P. Schwartz
(74) Attorney, Agent, or Firm—Daniel R. Edelbrock

(57) ABSTRACT

A sensor is attached to a backing plate of a brake pad. The sensor comprises a metal arm extending to one side of the brake pad. The metal arm is electrically insulated from the backing plate. A tab made from a dielectric material projects from a free end of the arm in the same direction that the brake pad extends from the backing plate. The tab is bonded to the arm by an electrically conductive paste. The tab has a wear face spaced from the backing plate the same distance as a brake surface of the brake pad. When a brake is applied by a vehicle operator, both the brake pad brake surface and the tab wear face frictionally engage a brake rotor fixed to a wheel hub. The dielectric material is selected so the tab wears at the same rate as the brake pad. A lead wire connected to the arm enables the capacitance of the tab to be measured by a grounded capacitance meter when the brake is applied. The capacitance changes as the dielectric material wears away. The capacitance is used to indicate the remaining amount of brake pad life on a digital readout.

20 Claims, 2 Drawing Sheets

BRAKE PAD WEAR SENSOR

BACKGROUND OF THE INVENTION

1. Field of the Invention

The invention is directed in general to vehicle brake pad wear sensors and more specifically to a sensor that is able to measure and display the actual amount of wear left on a brake pad at any given time.

2. Discussion of Related Art

Typical brake pad wear sensors use a simple electrical contact to switch on a warning indicator. When the contact is exposed to an electrically grounded brake rotor or drum after a certain amount of wear on the pad, a circuit is closed and current flows to a warning light. Other types of sensors sound an acoustic alarm when a portion of the sensor rubs against the drum or rotor after the brake pad wears a set amount. These warning devices do not indicate the amount of wear left on the brake pads, only that the pads need to be replaced. Because an uncertainty of when brake pad failure will actually occur exists, the designed brake pad life may be cut short due to premature brake pad replacement. In addition, the harsh environment in which brakes must operate often leads to failure of indicators that locate electrical circuitry or sensitive components close to the working brake parts.

Some prior sensors involve the use of capacitance in some manner to indicate brake wear. U.S. Pat. No. 6,105,422 discloses a brake tester having capacitive proximity sensors extending from a sleeve concentrically disposed about a brake shoe assembly. When the brake is applied and the brake shoes advance toward the sensors, the sleeve simulates a brake drum surface. A central processing unit receives signals from each sensor indicating the presence of the brake shoe. If the shoe does not contact the simulated drum surface, there is no signal from the adjacent sensor. The specific contact area between the brake shoe and drum surface can be identified, correct brake assembly can be confirmed and premature wear can be predicted. The device needs a large number of sensors to be accurate, does not indicate progressive wear of the brake shoes, and requires relatively expensive components such as the sensors themselves and the central processing unit.

In U.S. Pat. No. 5,632,359, the state of wear of a brake pad is monitored by a capacitive sensor. The sensor periodically measures the capacitance between contacts corresponding to relative positions of a brake caliper and a brake carrier connected to the earth potential of the vehicle. The capacitive measurement is compared to a predetermined threshold and a signal is sent based on the comparison result. Because of the number of moving brake components involved, the actual capacitive measurement may not provide a true indication of brake pad wear. This brake wear indicator also requires a microprocessor and relatively complex circuitry to process the capacitive measurement and decide on and generate the warning signal. In this age of increasingly complex and expensive electrical circuitry being placed in vehicles for purposes such as navigation and entertainment, it is important that design attention remain focused on driver and passenger safety. But safety devices should still be engineered to be simple, cost-efficient and failure-proof, and many typical brake pad wear sensors do not meet these standards.

SUMMARY OF THE INVENTION

Accordingly, it is an object of this invention to provide a device that measures and displays an accurate percentage of brake pad wear life remaining.

Another object of the invention is to eliminate premature brake pad replacement.

A further object of this invention is to provide a simple, relatively inexpensive and failure resistant sensor for measuring brake pad wear.

In carrying out this invention in the illustrative embodiment thereof, a brake pad wear sensor comprises a small probe positioned next to the brake pad. A dielectric material secured to the probe extends the same distance from a brake pad backing plate as the brake pad. The brake pad and sensor make contact with a face of a brake rotor as the pad is moved against the rotor. The probe consists of a metal arm that is mounted to the brake pad backing plate. The arm is electrically insulated from the plate. An electrical lead wire connects the arm to a grounded capacitance measuring device or meter. With the brake rotor connected to the earth potential of the vehicle, a capacitance value is generated when the dielectric material makes contact with the rotor face. The probe arm acts as a positive plate of a capacitor and the rotor acts as a negative plate of the capacitor. The dielectric material is worn away at the same rate as the brake pad. The changing capacitance value is translated into a percent of pad used or pad available.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
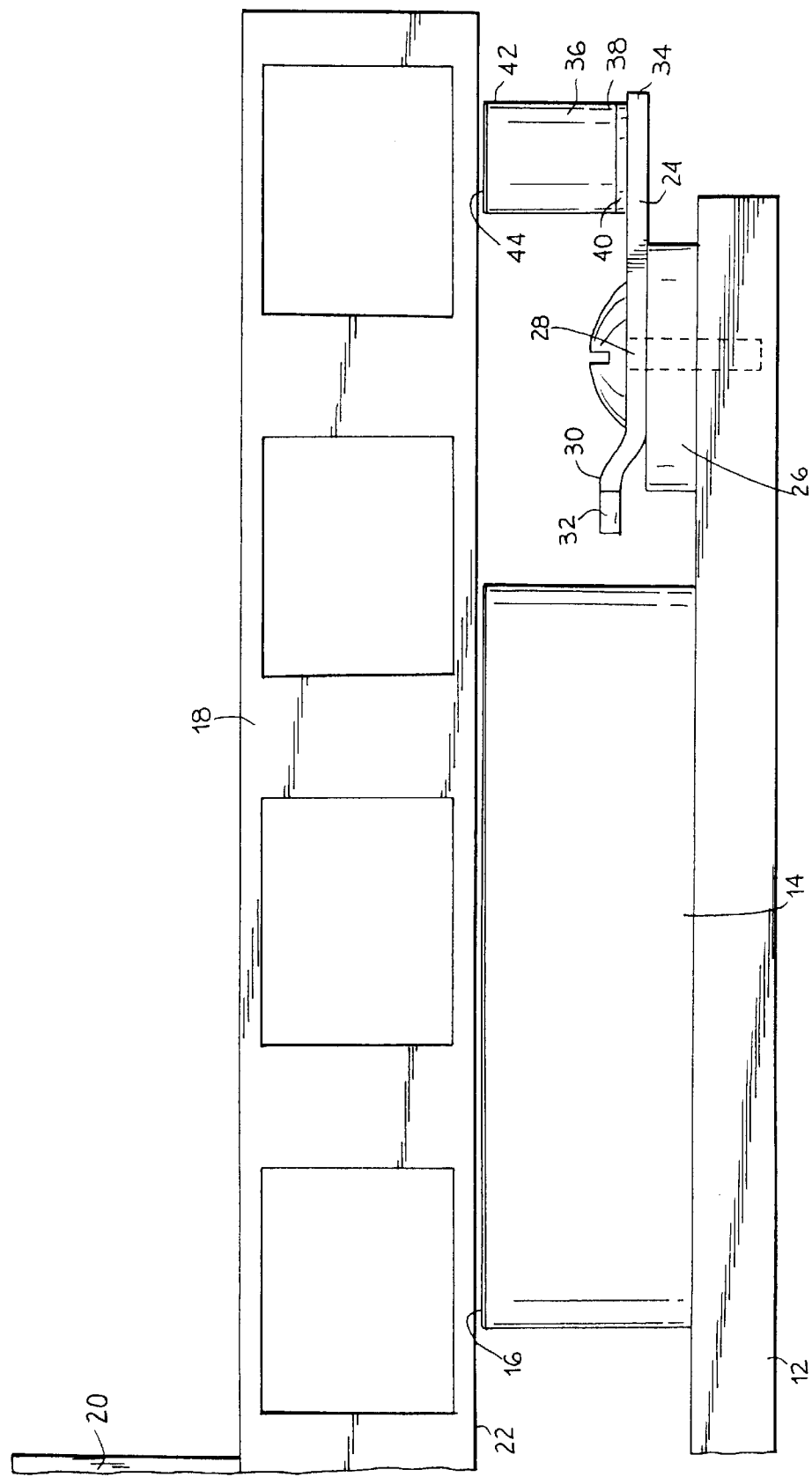
FIG. 1 is side view of a brake assembly and break pad wear sensor according to the present invention.
Figure 2:
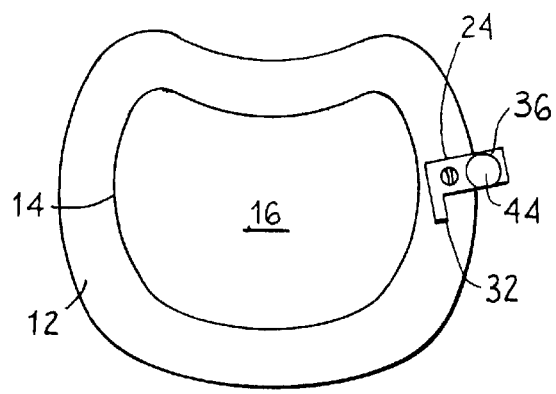
FIG. 2 is a reduced top view of a brake pad and backing plate of the assembly and the brake pad wear sensor.

Referring now to FIGS. 1 and 2, a brake pad backing plate 12 supports a brake pad 14. The brake pad backing plate fits into a caliper (not shown) in a conventional manner. The brake pad has a contact or brake surface 16 for pressing against a brake rotor 18. The rotor 18 is attached to and rotates with a wheel hub 20. When a brake mechanism (not shown) moves the support plate and brake pad toward the rotor in response to a vehicle operator pushing on, for example, a brake pedal, the brake pad brake surface 16 applies a rubbing force on a face 22 of the rotor 18. This slows and stops rotation of the wheel hub and movement of the vehicle. The frictional engagement of the rotor face 22 and the brake pad brake surface 16 causes a gradual wearing away of the brake pad, which is made of a softer metal than the rotor.

The present invention comprises a brake pad wear sensor mounted on the backing or support plate 12 on the same side of the plate as the pad 14, adjacent an edge or side of the pad. The sensor is a probe comprising an arm 24 secured by a fastener to the plate 12. The arm 24 is made from a rigid, electrically conductive metal. The arm is separated from the support plate 12 by a spacer 26 made from an electrically insulating material such as nylon. In the connection illustrated, a screw 28 extends through an aperture adjacent a first end 30 of the arm, through the insulating spacer 26, and into a threaded hole in the brake pad support plate 12. Other types of fasteners could be used. The screw or rivet or other type of fastener would be made of an electrically nonconductive plastic or a nonconductive metal such as brass. The first end 30 of the arm 24 has a portion 32 formed into a blade-like projection to act as a typical male electrical terminal. Alternatively, the portion 32 could be formed into a female terminal, or some other part of the arm could be formed into or used as an electrical terminal.

The arm 24 has a second, free end 34 that overhangs an edge of the support plate 12. A tab 36 extends from the second end of the arm in the same direction that the brake pad 14 extends from the support plate 12. The tab is made from a dielectric material that could be cylindrical in cross-section as shown, rectangular, or some other shape. The tab is bonded to the arm at a base end 38 of the tab by an electrically conductive paste or adhesive 40. An opposite, free end 42 of the tab has a tip with a wear face 44. The original thickness or length of the tab is set such that the wear face 44 is in the same plane as the contact or brake surface 16 of a new brake pad. In other words, the wear face 44 of the tab is spaced the same distance from the support plate 12 as the brake pad brake surface 16. The dielectric material could be made of, for example, a ceramic that would wear at the same rate as the brake pad. As the brake pad wears during frictional contact with the rotor face 22, the tab will also wear away from contact with the rotor face.

Since the surface areas of the rotor and arm and the dielectric constant of the insulating material do not change, a capacitance value generated by a capacitor created by the arm, dielectric material and rotor will change only with the thickness or length of the dielectric material. This capacitance will therefore provide a changing measurement of break pad wear as the dielectric material decreases in volume with the thickness or volume of the brake pad.

Figure 3:
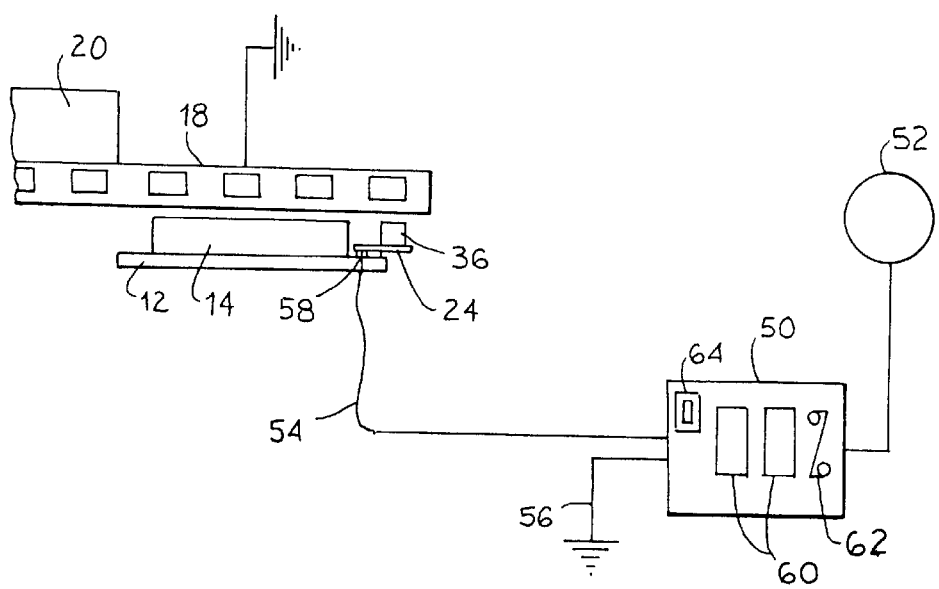
FIG. 3 illustrates the electrical connection between the sensor and a capacitance meter with a display.

FIG. 3 is a representation of a simple way to measure the capacitance and indicate the remaining wear on the brake pad. A conventional capacitance measuring device or meter 50, powered by the vehicle battery 52, would have a lead wire 54 electrically connecting the meter with the arm 24. A lead wire 56 electrically grounds the meter. The brake rotor is also grounded to the earth potential of the vehicle in a conventional manner. The lead wire 54 would have, for example, a female terminal 58 on an end of the wire 54 distal from the meter. The female terminal would receive and electrically mate with the male terminal 32 formed on the arm 24. This enables easy, quick, secure electrical connection of the meter with a new arm and tab when a worn brake pad is replaced. Of course, if the portion 32 of the arm 24 is formed into a female terminal, the terminal on the lead wire 54 would be of the male type.

The arm 24 would act as a positive capacitor plate and the rotor 18 would act as a negative capacitor plate. The capacitance meter 50 has a digital readout 60 in the passenger compartment of the vehicle and visible by the driver. A relatively inexpensive two-digit readout could be used with a symbol 62 indicating "percent" to the side of the readout. In operation, when the brake is applied, the support plate moves the brake surface 16 of the brake pad and the wear surface 44 of the dielectric material simultaneously against the rotor. With the dielectric tab in contact with the rotor, the capacitance meter 50 measures the capacitance and provides a digital readout. When the brake pad and dielectric material are new and unworn, for example, the readout would indicate the highest percentage of remaining brake pad life, 99% if a two-digit readout is used.

The type and amount of dielectric material could be selected to provide an easy correlation between the capacitance and percentage. In other words, the original or new capacitance of the tab could measure 100 microfarads. As the brake pad and dielectric tab begin to wear the capacitance will drop from 100 microfarads. When one-quarter of the dielectric material has been war away, one-quarter of the brake pad will have been worn away. The readout 60 would indicate 75%, informing the vehicle driver that the brake pad has three-quarters of its wear life remaining or is twenty-five percent worn away. As the brake pad continues to wear down, the dielectric tab will wear away until eventually the capacitance will approach zero. The owner's manual of the vehicle or some other indication, possibly on the digital readout, could be used to inform the driver at what percent the brake pad should safely be replaced.

The probe is sturdy and secure, with no independently moving parts added to the brake assembly. It will reliably withstand environmental challenges. The invention provides continuous measurement of brake pad wear as the pad erodes over time. Every time the brake is applied the driver would learn the condition of the brake pad, whether the pad is still safe and effective or is approaching the time for replacement. There are many advantages to having this knowledge. For example, suppose a driver is going on a vacation or long trip where failure of the brake pads would be extremely expensive and inconvenient. If the driver knew how much brake pad wear life remained prior to the trip, the driver could replace the pads before the trip if necessary without the risk of wasting the remaining life of the pads. Conversely, the driver might know with reasonable certainty that pad replacement could wait until after the trip.

Though only one brake pad and sensor are shown, there could be a sensor provided for each brake pad on the vehicle. The capacitance measurement from each pad could be shown alternately on one readout, or there could be any number of readouts for displaying the condition of each pad. The measurements could also be averaged into one display. A switch 64 could be used to activate the meter and readout only when desired. For example, readings taken when the brakes are dry may give more accurate measurements of capacitance. A normally open momentary switch could be used as the switch 64 so the vehicle operator does not have to turn the meter off. An automatic switch activated by a microprocessor that determines the best time to take the measurement based on environmental conditions could also be incorporated into the system. There are a number of different ways to measure, translate and display the capacitance. Only a single, inexpensive method has been illustrated. There could clearly be many different variations that would be within the scope of the invention.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A brake pad wear sensor comprising:
   a probe;
   means adapted for connecting the probe to a brake pad support plate;
   a dielectric material bonded to the probe such that the dielectric material extends from the probe in the same direction as a brake pad extends from the support plate and a tip of the dielectric material is the same distance from the support plate as a brake surface of the brake pad; and means attached to the probe for measuring the capacitance value of the dielectric material.

2. The brake pad wear sensor of claim 1 wherein the means for measuring the capacitance value is a capacitance meter.

3. The brake pad wear sensor of claim 2 wherein the capacitance meter is electrically connected to the probe and is adapted to be grounded to an earth potential.

4. The brake pad wear sensor of claim 2 further comprising a switch for selectively operating the capacitance meter.

5. The brake pad wear sensor of claim 1 further comprising means for indicating the capacitance value as a percentage of brake pad wear.

6. The brake pad wear sensor of claim 5 wherein the indicating means is a digital readout.

7. The brake pad wear sensor of claim 1 wherein the dielectric material is bonded to the probe by an electrically conductive paste.

8. The brake pad wear sensor of claim 1 wherein the probe is adapted to be separated from the brake pad support plate by an electrically insulated spacer.

9. The brake pad wear sensor of claim 1 wherein the dielectric material is one selected to wear at the same rate as the brake pad.

10. The brake pad wear sensor of claim 1 wherein the dielectric material is sized to decrease in volume at the same rate as the brake pad decreases in volume.

11. The brake pad wear sensor of claim 1 wherein the probe has a portion shaped as an electrical terminal.

12. The brake pad wear sensor of claim 11 wherein the means for measuring the capacitance has an electrical terminal for mating with the electrical terminal portion of the probe.

13. A brake pad assembly comprising:

a brake pad having a contact surface;

a plate for supporting the brake pad;

an arm extending from the support plate; and a tab made from a dielectric material secured to the arm, the tab extending away from the plate in the same direction as the brake pad, the tab having an end spaced from the plate the same distance as the contact surface of the brake pad.

14. The brake pad assembly of claim 13 wherein the end of the tab comprises a wear surface positioned in the same plane as the brake pad contact surface.

15. The brake pad assembly of claim 13 wherein the dielectric material is one selected to wear at the same rate as the brake pad.

16. The brake pad assembly of claim 13 wherein the tab is secured to the arm by an electrically conductive adhesive.

17. The brake pad assembly of claim 13 wherein the arm is electrically insulated from the support plate.

18. The brake pad assembly of claim 13 wherein the arm has a portion shaped as an electrical terminal.

19. A method for sensing the wear on a brake pad, the method comprising:

mounting a dielectric material to a break pad support plate such that it moves into contact with a brake rotor simultaneously with the brake pad; and measuring the capacitance value of the dielectric material as it wears with the brake pad.

20. The method of claim 19 further comprising the step of indicating the capacitance value as a percentage of brake pad wear life remaining.

* * * * *